(12) United States Patent
Washio (10) Patent No.: US 11,113,025 B2
(45) Date of Patent: Sep. 7, 2021

(54) INTERACTION MANAGEMENT DEVICE AND NON-TRANSITORY COMPUTER READABLE RECORDING MEDIUM

(71) Applicant: TOYOTA JIDOSHA KABUSHIKI KAISHA, Toyota (JP)

(72) Inventor: Masanobu Washio, Kobe (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/213,364

(22) Filed: Dec. 7, 2018

(65) Prior Publication Data
US 2019/0179612 A1    Jun. 13, 2019

(30) Foreign Application Priority Data

Dec. 11, 2017  (JP) .............................. JP2017-236961

(51) Int. Cl.
G06F 3/16          (2006.01)
G06F 3/0481        (2013.01)
G06F 40/174        (2020.01)

(52) U.S. Cl.
CPC ............ *G06F 3/167* (2013.01); *G06F 3/0481* (2013.01); *G06F 40/174* (2020.01)

(58) Field of Classification Search
CPC .... G06F 3/0482; G06F 3/167; G06F 17/5004; G06F 17/5086; G06F 1/3287; G06F 3/04842; G06F 16/2358; G06F 17/279; G06F 21/6254; G06F 3/016; G06F 3/048; G06F 3/04817; G06F 13/102; G06F 13/409; G06F 16/951; G06F 16/972; G06F 19/3418; G06F 21/36; G06F 21/87; G06F 2203/04101; G06F 2203/04108; G06F 2203/04803; G06F 3/012; G06F 3/013; G06F 3/017; G06F 3/0416; G06F 3/046; G06F 3/0484; G06F 3/04847; G06F 3/04883; G06F 8/65; G06F 9/4411;
(Continued)

(56) References Cited

U.S. PATENT DOCUMENTS

2012/0166929 A1*  6/2012  Henderson ............ G06F 17/243
                                                 715/224
2015/0324751 A1* 11/2015  Orenstein .............. G16H 20/30
                                                  702/3
(Continued)

FOREIGN PATENT DOCUMENTS

JP     2005301017 A     10/2005
JP     2015-069103 A    4/2015
(Continued)

*Primary Examiner* — Di Xiao
(74) *Attorney, Agent, or Firm* — Hunton Andrews Kurth LLP (57) ABSTRACT

An interaction management device fills items with data based on user's speech content. The interaction management device includes a control unit. The control unit is configured to estimate data with which to fill in a blank item that is not yet filled in with data based on a past action history of the user when there is the blank item, inquire of the user whether the data with which to fill in the blank item is the estimated data, and determine that the estimated data is data with which to fill in the blank item if a response indicating that the estimated data is correct is received from the user.

5 Claims, 4 Drawing Sheets

(58) Field of Classification Search
CPC .......... G06F 9/445; G06F 9/451; G06F 9/543; G06F 17/2785; G06F 16/3329; G06F 16/3344; G06F 16/9537; G06F 17/28; G06F 17/2765; G06F 9/54; G06F 3/04886; G06F 17/24; G06F 16/40; G06F 16/43; G06F 16/444; G06F 16/60; G06F 16/638; G06F 16/683; G06F 16/685; G06F 17/241; G06F 17/273; G06F 17/277; G06F 17/289; G06F 1/1626; G06F 1/1632; G06F 1/266; G06F 1/3265; G06F 1/329; G06F 2200/1614; G06F 3/011; G06F 3/0237; G06F 3/0488; G06F 16/00; G06F 16/24578; G06F 16/29; G06F 16/3347; G06F 16/335; G06F 16/44; G06F 16/447; G06F 16/634; G06F 16/68; G06F 16/7844; G06F 16/9535; G06F 17/2241; G06F 17/2247; G06F 17/227; G06F 17/2288; G06F 17/271; G06F 17/276; G06F 17/2795; G06F 21/00; G06F 21/32; G06F 21/34; G06F 21/50; G06F 21/552; G06F 2203/0381; G06F 3/16; G06F 9/453; G06F 9/454; G06F 9/50

See application file for complete search history.

(56) References Cited

U.S. PATENT DOCUMENTS

| | | | |
|---|---|---|---|
| 2016/0293162 | A1 | 10/2016 | Takahashi et al. |
| 2017/0177715 | A1* | 6/2017 | Chang ................ G06F 17/2785 |
| 2020/0327179 | A1 | 10/2020 | Matsumoto et al. |

FOREIGN PATENT DOCUMENTS

| | | |
|---|---|---|
| JP | 2016197227 A | 11/2016 |
| JP | 2017194850 A | 10/2017 |

* cited by examiner

| SERVICE FRAME (SCHEDULER) | |
|---|---|
| ITEM | DATA |
| DATE | ........... |
| START TIME | ........... |
| END TIME | ........... |
| PURPOSE | ........... |
| PLACE | ........... |

| SERVICE FRAME (NAVIGATION) | |
|---|---|
| ITEM | DATA |
| DATE | ........... |
| START TIME | ........... |
| ARRIVAL TIME | ........... |
| START PLACE | ........... |
| DESTINATION | ........... |

INTERACTION MANAGEMENT DEVICE AND NON-TRANSITORY COMPUTER READABLE RECORDING MEDIUM

INCORPORATION BY REFERENCE

The disclosure of Japanese Patent Application No. 2017-236961 filed on Dec. 11, 2017 including the specification, drawings and abstract is incorporated herein by reference in its entirety.

BACKGROUND

1. Technical Field

The present disclosure relates to an interaction management device and a non-transitory computer recordable recording medium for filling in items with data based on the user's speech content.

2. Description of Related Art

Japanese Patent Application Publication No. 2015-69103 (JP 2015-69103 A) discloses an information processing device that determines whether all the required items for retrieval are filled in when speech retrieval is done based on an entered speech. If it is determined that all the required items are not filled in, this information processing device requests the user to enter speech information on an item that is not yet filled in or that requires supplementary information.

SUMMARY

However, if it is determined that data for obtaining a retrieval result is insufficient, the information processing device according to Japanese Patent Application Publication No. 2015-69103 (JP 2015-69103 A) requires the user to provide speech input to fill in all the items for which data is insufficient (for example, the place, the start time, etc.; in the description below, an item for which data is insufficient is also referred to as a "blank item"). For this reason, even if the data with which to filled in a blank item (the so-called a slot) is the start time, or the place, of a morning meeting that is usually fixed, the user must fill in all the content via speech, with the possibility that the user's convenience is reduced.

The present disclosure provides an interaction management device and a non-transitory computer readable recording medium that can increase user convenience.

An interaction management device according to a first aspect of the present disclosure fills in each item of one or more service frames with data based on user's speech content, wherein each of the one or more service frames is composed of a plurality of items. The interaction management device that fills in each item of one or more service frames with data based on user's speech content, each of the one or more service frames being composed of a plurality of items, the interaction management device characterized by comprising a control unit configured to identify the one or more service frames based on the user's speech content and, for the identified service frames, to identify items to be filled in with data, fill in the identified items with data corresponding to the speech content, estimate data with which to fill in a blank item based on a past action history of the user when there is the blank item in the service frame that has the identified items filled with data, the blank item being an item not yet filled in with data, inquire of the user whether the data with which to fill in the blank item is the estimated data, and determine that the estimated data is data with which to fill in the blank item if a response indicating that the estimated data is correct is received from the user.

A second aspect of the present disclosure is a non-transitory computer readable recording medium storing a program causing a computer to function as units, wherein the computer fills in each item of one or more service frames with data based on user's speech content, and each of the one or more service frames is composed of a plurality of items. The units include an identification unit configured to identify the one or more service frames based on the user's speech content and, for the identified service frames, to identify items to be filled in with data, a filling unit configured to fill in the identified items with data corresponding to the speech content, an estimation unit configured to estimate data with which to fill in a blank item based on a past action history of the user when there is the blank item in the service frame that has the identified items filled with data, the blank item being an item not yet filled in with data; an inquiry unit configured to inquire of the user whether the data with which to fill in the blank item is the estimated data; and a determination unit configured to determine that the estimated data is data with which to fill in the blank item if a response indicating that the estimated data is correct is received from the user.

According to the aspects described above, the interaction management device and the non-transitory computer readable recording medium that increase user convenience can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A preferred embodiment of the present disclosure will be described in detail below with reference to the drawings. In the diagrams below, the components having the same reference numeral have the same or similar configuration.

Embodiment

Configuration

Figure 1:
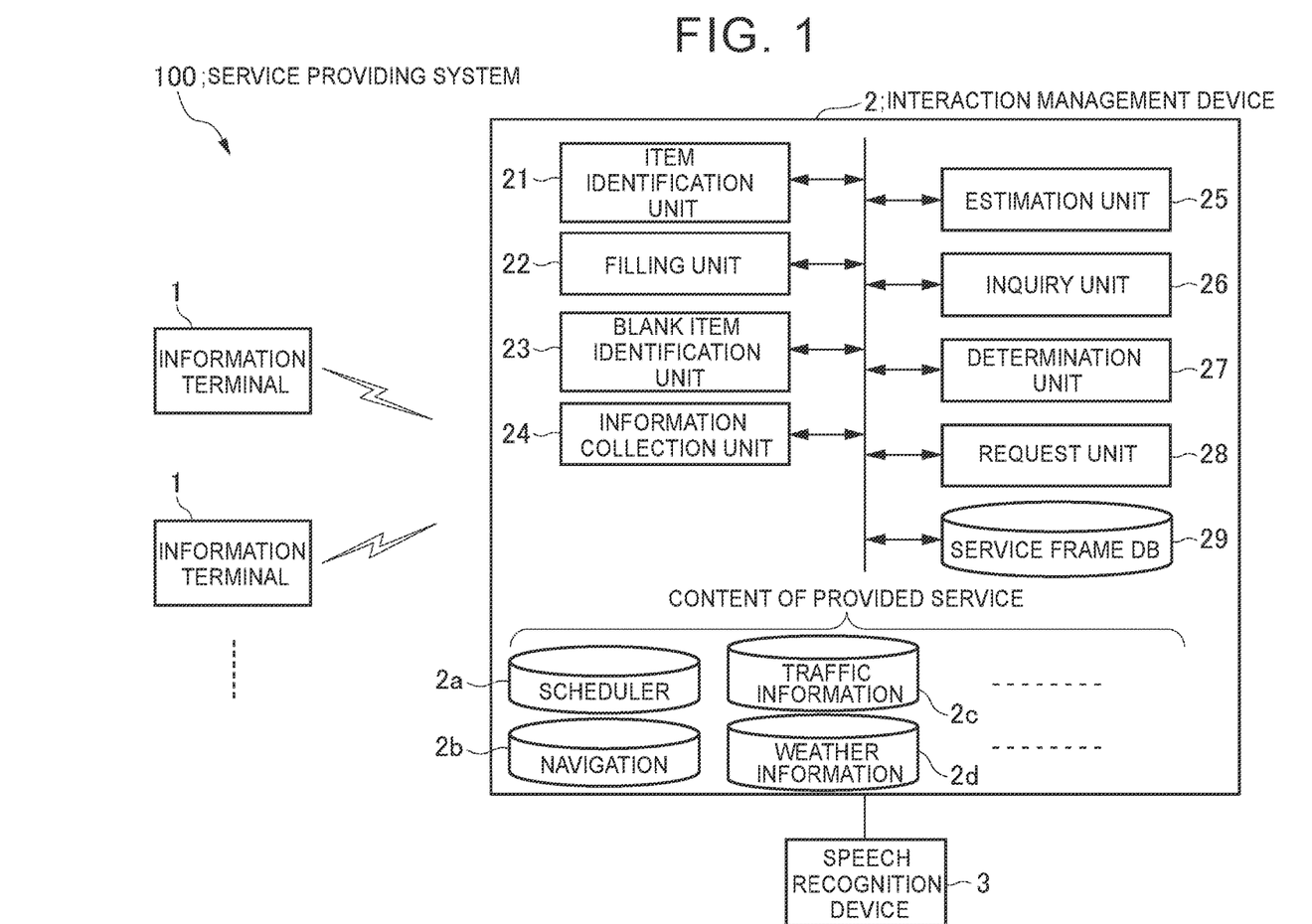
FIG. 1 is a diagram showing an example of a configuration of a service providing system that includes an interaction management device.

A preferred embodiment of a service providing system in the present disclosure will be described. In the figures, the components with the same reference numeral have the same or similar configuration. With reference to FIG. 1, a configuration of the service providing system that includes an interaction management device according to this embodiment will be described. A service providing system 100 includes one or more information terminals 1, an interaction management device 2, and a speech recognition device 3. The information terminal 1 is used by each user, while the interaction management device 2 and the speech recognition device 3 are arranged in a data center. The information terminal 1 and the interaction management device 2 are connected, and the interaction management device 2 and the speech recognition device 3 are connected, so that they can communicate with each other via a network.

The network may be wired or wireless or a combination of both. In the example in this embodiment, the information terminal 1 and the interaction management device 2 are connected via a wireless network, and the interaction management device 2 and the speech recognition device 3 are connected via a wired network.

The information terminal 1 shown in FIG. 1 is a terminal device such as a smartphone, a mobile phone, a wearable terminal, a personal digital assistant (PDA), a tablet terminal, a personal computer (PC), or a notebook PC. The information terminal 1 is physically configured by a control unit, which includes a CPU and a memory such as a ROM and a RAM, an operation unit, a display, a storage unit, a communication unit, an input device such as a microphone, and an output device such as a speaker. The CPU executes predetermined programs, stored in the memory, to implement various functions incorporated in the information terminal 1.

The interaction management device 2 is a device that uses the slot filling technology to provide the speech recognition-based service through speech interaction with the user (for example, schedule registration; in the description below, such a service is collectively referred to as a "service"). The interaction management device 2 includes an item identification unit 21, a filling unit 22, a blank item identification unit 23, an information collection unit 24, an estimation unit 25, an inquiry unit 26, a determination unit 27, a request unit 28, and a service frame database (DB) 29. The interaction management device 2 is physically configured by a control unit, which includes a CPU and a memory, a storage device, and a communication device. The CPU executes predetermined programs, stored in the memory, to implement the functions of the item identification unit 21, the filling unit 22, the blank item identification unit 23, the information collection unit 24, the estimation unit 25, the inquiry unit 26, the determination unit 27, the request unit 28, and the service frame DB 29. The detail of each function will be described later.

The service frame DB 29 includes service frames, each of which includes a plurality of items (slots) to be filled with data, one for each service. The services described above include a scheduler, navigation, traffic information, weather information, and so on. The content necessary for providing the services is stored in the databases provided in the interaction management device 2. For example, as the databases for storing content, there are a scheduler DB2*a*, a navigation DB2*b*, a traffic information DB2*c*, and a weather information DB2*d*.

Figure 2:
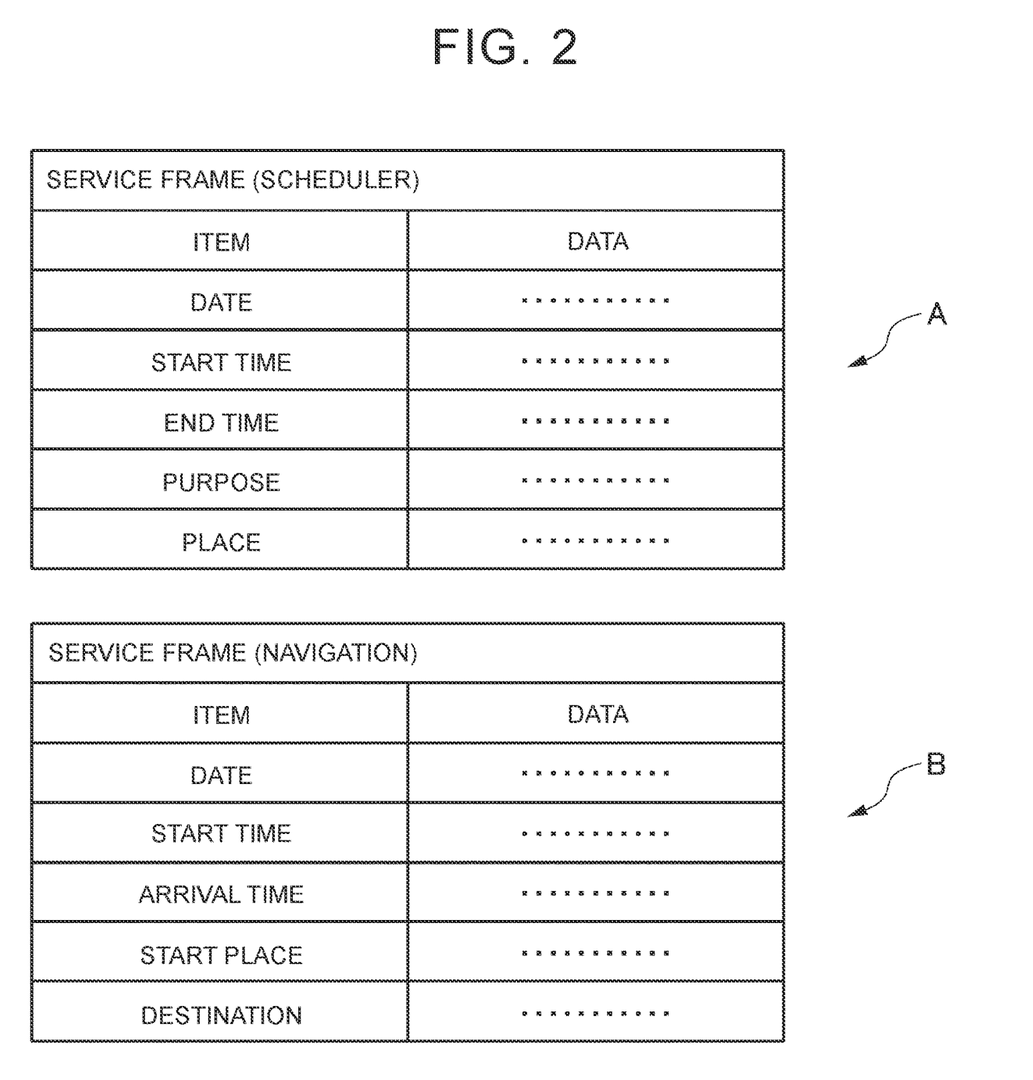
FIG. 2 is a diagram showing an example of service frames.

FIG. 2 is a diagram showing an example of service frames stored in the service frame DB 29. "A" in FIG. 2 indicates a service frame when the service is the scheduler, and "B" in FIG. 2 indicates a service frame when the service is the navigation (route search).

As illustrated by "A" in FIG. 2, the service frame of the scheduler includes the items such as Date, Start time, End time, Purpose, and Place as the items to be filled with data (in which data is entered). On the other hand, as illustrated by "B" in FIG. 2, the service frame of the navigation (route search) includes the items such as Date, Start time, Arrival time, Start place, and Destination as the items to be filled with data (in which data is entered).

The item identification unit 21 receives content spoken by the user from the information terminal 1 (in the description below, the content spoken by the user is also referred to as "speech content"), analyzes the received spoken content, and identifies the item to be filled with data. The outline of the procedure for identifying an item will be described below.

A user's speech sent from the information terminal 1 is received by the speech recognition device 3. The speech recognition device 3 analyzes the received speech, converts the received speech into a text message, and sends the converted text message to the interaction management device 2. The speech can be analyzed using a known speech analysis technique (e.g., fast Fourier transform, short time Fourier transform, wavelet transform, deep learning, etc.).

Next, based on the speech content of the text message received from the speech recognition device 3, the item identification unit 21 of the interaction management device 2 identifies a service frame. In addition, from among a plurality of items that is set in the identified service frame, the item identification unit 21 identifies the items to be filled in with data corresponding to the speech content.

The filling unit 22 fills in the items, identified by the item identification unit 21, with data corresponding to the speech content (enters data in the items).

The blank item identification unit 23 identifies an item which was left unfilled with data by the filling unit 22 (in the description below, such an item is also referred to as a "blank item").

The information collection unit 24 collects information necessary for filling in a blank item. In this embodiment, as the information necessary for filling in a blank item, the information related to the user's action history is used (in the description below, this information is also referred to as "action history related information"). The action history related information includes the schedule information indicating the past schedules of the user, the position information indicating the current position of the user, and so on. The information collection unit 24 acquires the user's action history related information from an external server, a provided service, and so on (in the description below, such a server or service is collectively referred to as an "external node").

The estimation unit 25 estimates data with which to fill in a blank item, based on the user's action history related information collected by the information collection unit 24. In the description below, estimated data with which to filled in a blank item is referred to as "estimated blank-item data".

The inquiry unit 26 inquires of the user whether the estimated blank-item data, generated by the estimation unit 25, is correct. The inquiry unit 26 creates an interaction message that inquiries of the user whether the estimated blank-item data is correct and then, via the speech recognition device 3, outputs a speech that reads the created sentence.

If a response indicating that the estimated blank-item data is correct is received from the user, the determination unit 27 determines that the estimated blank-item data is data with which to fill in the blank item. More specifically, if the user has spoken to the effect that the estimated blank data is correct, the speech content is analyzed by the speech recognition device 3 and then converted into a text message. If, based on the text message received from the speech recognition device 3, it is recognized that the response indicating that the estimated blank-item data is correct is received from the user, the determination unit 27 determines that the estimated blank-item data is data with which to fill in the blank item, based on the received text message. Then, the determination unit 27 creates an interaction message stating that the registration is completed and outputs the created interaction message via speech using the speech recognition device 3.

If the response indicating that the estimated blank-item data is incorrect (that is, it is wrong) is received from the user, the request unit 28 requests the user to enter data with which to fill in the blank item. More specifically, if the user has spoken to the effect that the estimated blank data is incorrect, the speech content is analyzed by the speech recognition device 3 and then converted into a text message. If, based on the text message received from the speech recognition device 3, it is recognized that the response to the effect that the estimated blank-item data is incorrect is received from the user, the request unit 28 creates an interaction message requesting the user to enter data with which to fill in the blank item. The request unit 28 outputs the created interaction message via speech using the speech recognition device 3.

When the user speaks a response in response to the request, the user's speech content is analyzed by the speech recognition device 3, converted into a text message, and then sent to the determination unit 27. Based on the received text message, the determination unit 27 determines a part of data, included in the user's response, as the data with which to fill in the blank item. Then, the determination unit 27 creates an interaction message stating that the registration is completed and outputs the created interaction message via speech using the speech recognition device 3.

Operation

The operation of the service providing system 100 will be described below with reference to the sequence diagrams shown in FIG. 3 and FIG. 4. In the following description, it is assumed that the user registers a meeting schedule in the scheduler using the interaction management device 2.

Figure 3:
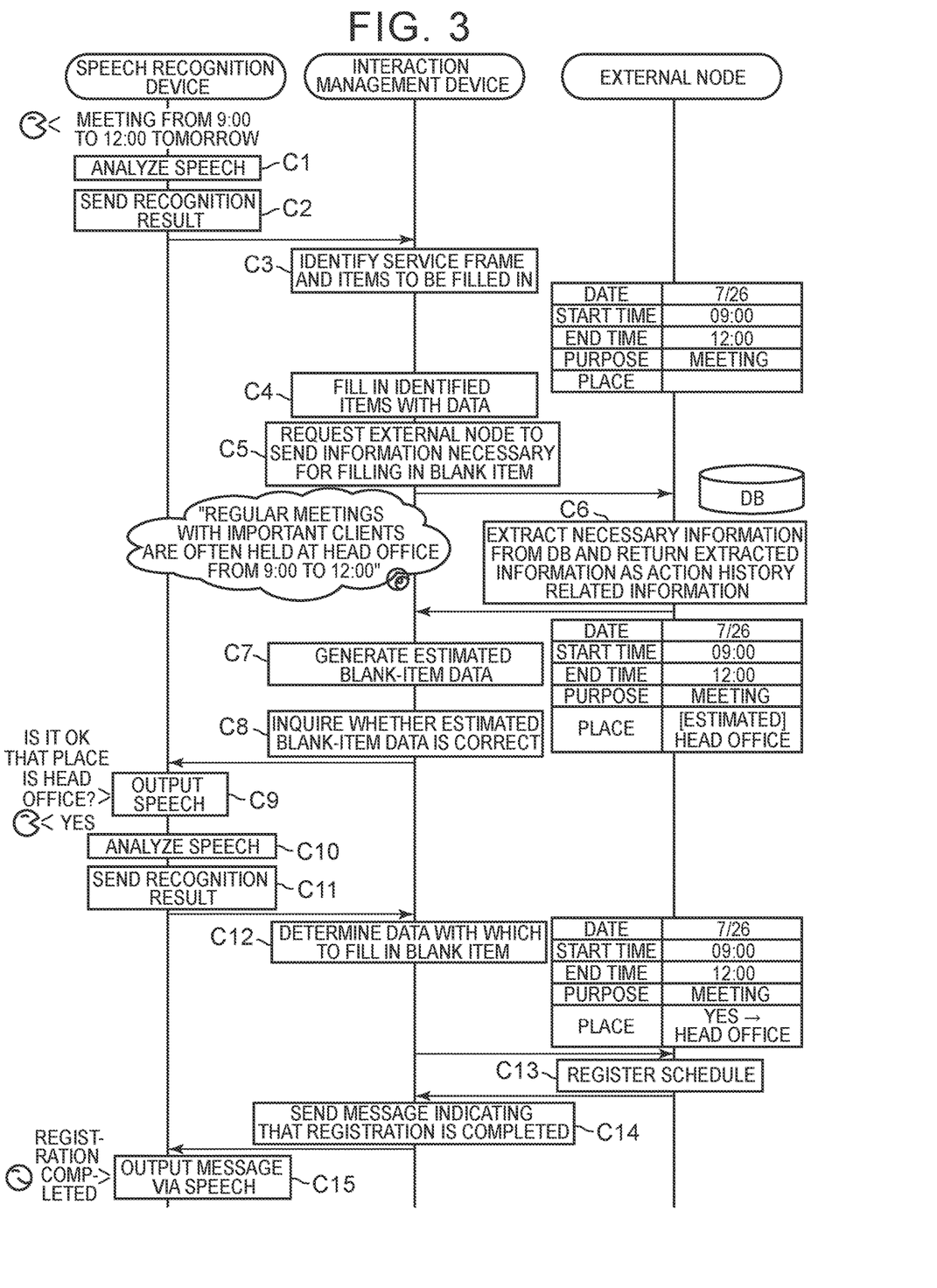
FIG. 3 is a sequence diagram showing the operation of the service providing system (when estimated blank-item data is correct)
Figure 4:
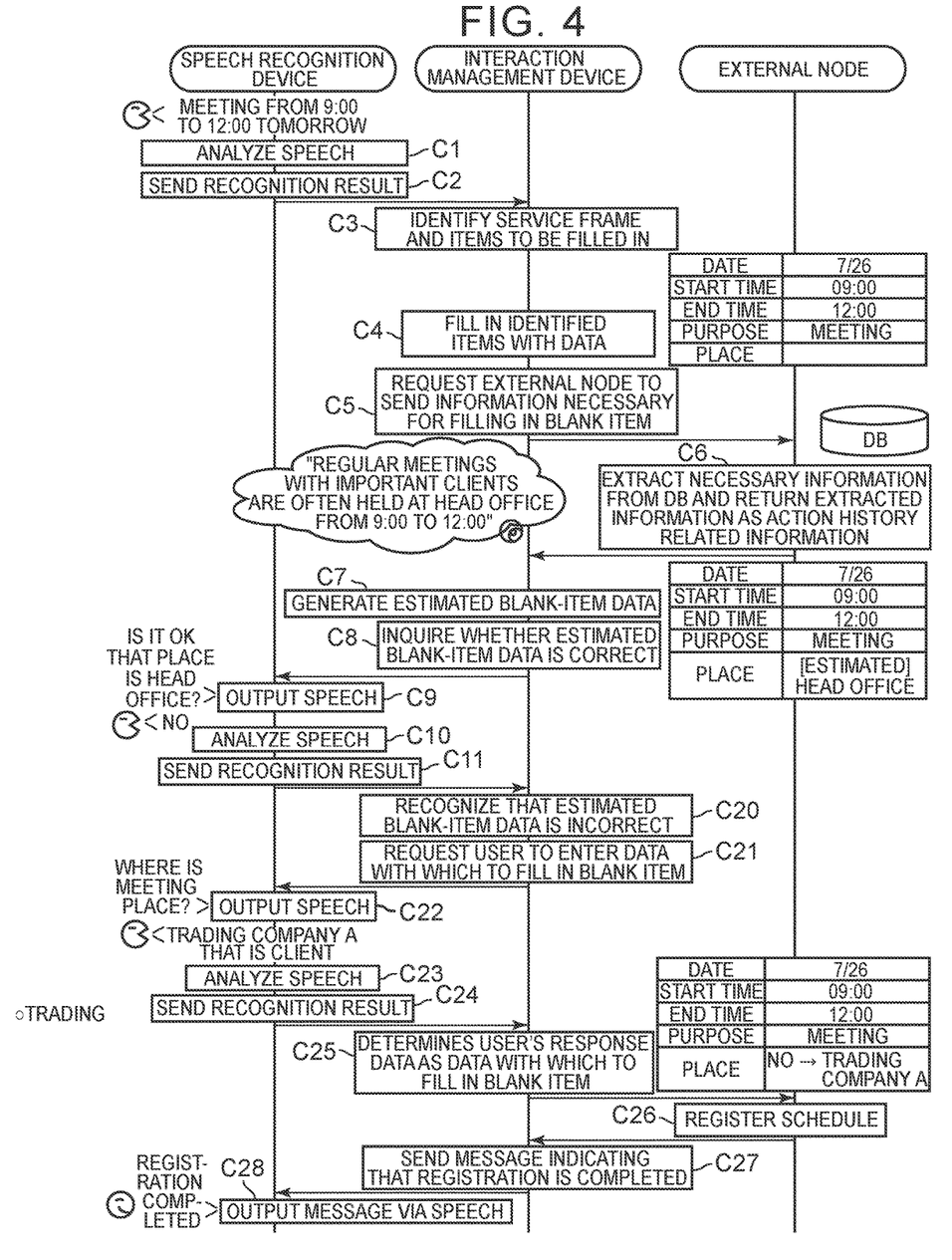
FIG. 4 is a sequence diagram showing the operation of the service providing system (when estimated blank-item data is incorrect).

FIG. 3 is a sequence diagram when it is determined by the user that the estimated blank-item data is correct, and FIG. 4 is a sequence diagram when it is determined by the user that the estimated blank-item data is incorrect. The same reference numeral is assigned to the steps that are common to FIG. 3 and FIG. 4i, and a detailed description will not be repeated.

The user speaks on the input device (not shown) of the information terminal 1 that "meeting from 9:00 to 12:00 tomorrow (7/26)". The user's speech is sent to the speech recognition device 3 via the input device. The speech recognition device 3 analyzes the received speech (step C1), converts the analyzed speech to a text message, and sends the recognition result of the speech content to the interaction management device 2 (step C2).

The item identification unit 21 of the interaction management device 2 identifies a service frame based on the speech content of the text received from the speech recognition device 3. In addition, from among a plurality of items that is set in the identified service frame, the item identification unit 21 identifies the items to be filled with data corresponding to the speech content. In the example shown in FIG. 3, the item identification unit 21 analyzes the user's speech content ("meeting from 9:00 to 12:00 on 7/26") and identifies "Date", "Start time", "End time", and "Purpose" as the items to be filled in with data (step C3).

The filling unit 22 fills in (fills) the items, identified by the item identification unit 21, with data corresponding to the speech content. The filling unit 22 fills in the items "Date", "Start time", "End time", and "Purpose" with the data "7/26", "9:00", "12:00 ", and "Meeting", respectively, corresponding to the speech content (step C4).

The blank item identification unit 23 identifies an item (that is, a blank item; in this example "Place") that was not filled in by the filling unit 22. Then, the blank item identification unit 23 sends the notification about the identified blank item to the information collection unit 24.

In response to the notification from the blank item identification unit 23, the information collection unit 24 collects the information necessary for filling in the blank item. To do so, the information collection unit 24 requests an external node to send the information necessary for filling in the blank item (step C5). In response to this request, the external node extracts the information, which is thought to be necessary to fill in the blank item (in this example, "Place"), from a predetermined database and returns the extracted information to the information collection unit 24 as the action history related information (step C6). As the user's action history related information, the information collection unit 24 acquires the information, which indicates that "Regular meetings with important clients are often held at head office (Nagoya) from 9:00 to 12:00", from the external node.

Based on the user's action history related information collected by the information collection unit 24, the estimation unit 25 estimates data with which to fill in the blank item. In the example shown in FIG. 3, based on the user's action history related information indicating that "Regular meetings with important clients are often held at head office from 9:00 to 12:00", the estimation unit 25 estimates that the data with which to fill in the blank item ("Place") is likely to be "head office". Based on this estimation, the estimation unit 25 generates estimated blank-item data indicating that the place is "head office" (step C7).

The inquiry unit 26 inquires of the user whether the estimated blank-item data generated by the estimation unit 25 is correct. More specifically, the inquiry unit 26 creates an interaction message that inquires of the user whether the estimated blank-item data is correct ("Is it OK that Place is 'head office'?") (Step C8). Then, the inquiry unit 26 uses the speech recognition device 3 to output the interaction message via speech (step C9).

When estimated blank-item data is correct (see FIG. 3): The user confirms the interaction message that is output from the output device (not shown) of the information terminal 1. If it is determined that the estimated blank-item data is correct, the user responds that the estimated blank-item data is correct ("Yes"). The user's response (that is, the use's speech content) is analyzed by the speech recognition device 3 (step C10), converted into a text message, and sent to the interaction management device 2 (step C11).

If it is determined, based on the text message received from the speech recognition device 3, that the response indicating that the estimated blank-item data is correct is received from the user, the determination unit 27 determines, based on the received text message ("Yes"), that the estimated blank-item data ("head office") is data with which to fill in the blank item (step C12). Then, the determination unit 27 instructs the external node to fill in the blank item with the estimated blank-item data ("head office") that has been determined.

In response to the instruction received from the determination unit 27, the external node fills in the blank item with the estimated blank-item data that has been determined. After that, the external node completes the schedule registration (step C13) and returns the message, which indicates that the registration is completed, to the determination unit 27. Upon receiving the message indicating that the schedule registration is completed, the determination unit 27 creates an interaction message indicating that registration is completed ("registration completed") (step C14) and uses the speech recognition device 3 to output the interaction message via speech (step C15).

When estimated blank-item data is incorrect (see FIG. 4): On the other hand, if it is determined that the estimated blank-item data is incorrect, the user responds that the estimated blank-item data is incorrect ("No"). The user's response (that is, the use's speech content) is analyzed by the speech recognition device 3 (step C10), converted into a text message, and sent to the interaction management device 2 (step C11).

If it is determined, based on the text message received from the speech recognition device 3, that the response indicating that the estimated blank-item data is incorrect (wrong) is received from the user (step C20), the request unit 28 creates an interaction message ("Where is meeting place?") that requests the user to enter data with which to fill in the blank item (step C21). The request unit 28 uses the speech recognition device 3 to output the created interaction message via speech (step C22).

In response to the request from the request unit 28, the user speaks a response (for example, "trading company A that is client)". The content spoken by the user is analyzed by the speech recognition device 3 (step C23), converted into a text message, and sent to the determination unit 27 (step C24). Based on the received text message, the determination unit 27 determines a part of data, included in the user's response (in this example, "trading company A"; in the description below, this data also referred to as "user's response data"), as the data with which to fill in the blank item (step C25). Then, the determination unit 27 instructs the external node to fill in the blank item with the determined user's response data ("trading company A").

The external node fills the blank item with the determined user's response data according to the instruction from the determination unit 27 (step C26). After that, the external node completes the schedule registration and returns the message, which indicates that the registration is completed, to the determination unit 27. Upon receiving the message indicating that the schedule registration is completed, the determination unit 27 creates an interaction message indicating that registration is completed ("registration completed") (step C27) and uses the speech recognition device 3 to output the interaction message via speech (Step C28).

As described above, the interaction management device in this embodiment fills in the items of a service frame with data while interacting with the user. When there is a blank item (for example, "Place") with which data is not yet filled in, the interaction management device estimates data (for example, "head office") with which to fill in the blank item based on the user's past action history. Then, the interaction management device inquires of the user whether the estimated data is correct (for example, "Is it OK that Place is head office?"). If the response indicating that the estimated data is correct (for example, "Yes") is received, the interaction management device fills in the blank item with the estimated data.

The interaction management device described above eliminates the need for the user to respond, via speech, to a request to enter specific data with which to fill in a blank item each time a blank item is detected, making it possible to respond with a simple response (for example, "Yes"). In addition, an inquiry about a blank item (for example, "Place") is sometimes responded with content not related to all to the blank item (for example, content corresponding to "Date"), with the result that the blank item is not filled in. In such a case, confusion is created since the device cannot understand the content of the response. The interaction management device described above can prevent this problem from being generated.

Modification

Although one piece of estimated blank-item data is generated for one blank item in the embodiment described above, the estimation unit 25 may generate a plurality of pieces of estimated blank-item data. For example, assume that, when the blank item is "Place", the estimation unit 25 generates two pieces of estimated blank-item data, "head office" and "Silicon Valley branch office", based on the user's action history related information. In this case, the inquiry unit 26 is only required to generate an interaction message inquiring which of the two pieces of estimated blank-item data is to be used (for example, "Is Place head office or Silicon Valley branch office?"). Note that, if there is a plurality of blank items, the inquiry unit 26 may generate estimated blank-item data for each of the blank items for inquiry.

In addition, the estimated blank-item data may be generated considering not only the user's action history related information but also the user's current position information. For example, when the blank item is "Place", the estimation unit 25 determines that the place is most likely to be "head office (Nagoya)" when the place is estimated based only on the user's action history related information; on the other hand, the estimation unit 25 determines that the possibility that the place is "head office" is almost zero when the user's current position information is taken into consideration (for example, when the user is on a business trip to Silicon Valley). In this case, the estimation unit 25 generates "Silicon Valley branch office" as the estimated blank-item data, considering the user's action history related information acquired by the information collection unit (first acquisition unit) 24 as well as the user's current position acquired by the GPS receiver (second acquisition unit). Note that, if the estimation unit 25 determines that it is difficult to estimate "Place" in such a case, the inquiry unit 26 may directly generate an interaction message inquiring the user of "Place".

When there is a plurality of candidate services (for example, "scheduler" and "navigation") each of which has a blank item to be filled in (for example, "Start time"), the estimation unit (decision unit) 25 may decide the priority of the services for which the inquiry is made, based on the user's action history related information. According to the priority that is decided in this way, the estimation unit 25 estimates data with which to fill in the blank item.

For example, if the estimation unit 25 determines that the priority of "navigation" is higher than that of "scheduler" based on the user's action history related information, the inquiry unit 26 generates an interaction message such as "Is it OK to leave for head office at 7:00?" so that the blank item ("Start time") of "navigation" is filled in. On the other hand, if the estimation unit 25 determines that the priority of "scheduler" is higher than that of "navigation" based on the user's action history related information, the inquiry unit 26 generates an interaction message such as "Is it OK to start meeting at 7:00?" so that the blank item ("Start time") of "scheduler" is filled in". In this manner, the priority of services whose blank item is to be filled in, if decided in advance based on the user's action history, makes it possible to generate highly accurate estimated blank-item data.

Others

The present invention is not limited to the above-described embodiment and modification, but can be implemented in various other forms without departing from the spirit of the present invention. For example, the order of the processing steps described above may be arbitrarily changed or may be executed in parallel as long as there is no inconsistency in the processing content.

In this specification, a "unit" or a "part" does not simply mean a physical configuration, but includes software-implemented processing executed by the "unit" or "part". In addition, the processing executed by one "unit" or "part" may be implemented by two or more physical configurations or devices; similarly, the processing executed by two or more "units" or "parts" may be implemented by one physical unit or device. The applicable field of the service providing system, though not specifically mentioned in the above example, includes various electronic apparatuses (for example, a tablet terminal, a smartphone, a portable information terminal, etc.) mounted on a vehicle.

In addition, the program for implementing the processing described in this specification may be stored in a recording medium. The use of this recording medium allows the above-described program to be installed in a computer that configures the interaction management device 2. The recording medium storing therein the above-described program may be a non-transitory recording medium. Any non-transitory recording medium may be used. For example, a recording medium such as a CD-ROM may be used.

What is claimed is:

1. An interaction management device that fills in each item of one or more service frames with data based on user's speech content, each of the one or more service frames being composed of a plurality of items, the interaction management device comprising a control unit configured to
    receive a speech content spoken by a user;
    analyze the received user's speech content;
    identify the one or more service frames based on the user's speech content and identify items to be filled in with the data for the identified one or more service frames;
    fill in one identified item with the data corresponding to the user's speech content;
    estimate another data with which to fill in a blank item of the identified one or more service frames based on a past action history of the user when the blank item is an item not yet filled in with any data;
    inquire of the user whether the estimate another data with which to fill in the blank item is a correct estimated data via a speech recognition device; and
    determine that the estimated another data is the correct estimated data with which to fill in the blank item if a response indicating that the estimated another data is correct is received from the user,
    wherein the one or more service frames comprise at least one selected from a scheduler, navigation, traffic information, and weather information.

2. The interaction management device according to claim 1, wherein:
    the control unit is configured to acquire, from an external source, action history related information related to the past action history of the user, and acquire current position information representing a current position of the user; and
    the control unit is configured to estimate the data with which to fill in the blank item based on the action history related information and the current position information that have been acquired.

3. The interaction management device according to claim 1, wherein:
    the control unit is configured to decide a priority of the one or more service frames for which the another data with which to fill in the blank item is estimated, based on the past action history of the user, and
    the control unit is configured to estimate the another data with which to fill in the blank item in order from a high-priority service frames according to the decided priority.

4. The interaction management device according to claim 1, wherein the control unit is configured to request the user to speak data with which to fill in the blank item if a response indicating that the estimated data is incorrect is received from the user.

5. A non-transitory computer readable recording medium storing a program causing a computer to function as units, the computer filling in each item of one or more service frames with data based on user's speech content, each of the one or more service frames being composed of a plurality of items, the units comprising:
    a speech recognition device configured to analyze the speech content received and spoken by a user;
    an identification unit configured to identify the one or more service frames based on the user's speech content and identify items to be filled in with the data for the identified one or more service frames;
    a filling unit configured to fill in one identified item with the data corresponding to the user's speech content;
    an estimation unit configured to estimate another data with which to fill in a blank item of the identified one or more service frames based on a past action history of the user when the blank item is an item not yet filled in with any data;
    an inquiry unit configured to inquire of the user whether the estimate another data with which to fill in the blank item is correct via a speech recognition device; and
    a determination unit configured to determine that the estimated another data is a correct data with which to fill in the blank item if a response indicating that the estimated another data is correct is received from the user,
    wherein the one or more service frames comprise at least one selected from a scheduler, navigation, traffic information, and weather information.

* * * * *